(12) United States Patent
Perneti et al.

(10) Patent No.: US 11,847,490 B2
(45) Date of Patent: Dec. 19, 2023

(54) INTELLIGENT WORKLOAD SCHEDULING USING A RANKING OF SEQUENCES OF TASKS OF A WORKLOAD

(71) Applicant: Dell Products L.P., Round Rock, TX (US)

(72) Inventors: Jayanth Kumar Reddy Perneti, Bangalore (IN); Vindhya Gangaraju, Davanagere (IN)

(73) Assignee: Dell Products L.P., Round Rock, TX (US)

( * ) Notice: Subject to any disclaimer, the term of this patent is extended or adjusted under 35 U.S.C. 154(b) by 351 days.

(21) Appl. No.: 17/178,353

(22) Filed: Feb. 18, 2021

(65) Prior Publication Data

US 2022/0261278 A1    Aug. 18, 2022

(51) Int. Cl.
*G06F 9/455*    (2018.01)
*G06F 9/48*    (2006.01)
*G06F 9/50*    (2006.01)

(52) U.S. Cl.
CPC ........ *G06F 9/4881* (2013.01); *G06F 9/45558* (2013.01); *G06F 9/5077* (2013.01); *G06F 2009/4557* (2013.01)

(58) Field of Classification Search
CPC .................................................. G06F 9/4881
USPC ............................................................ 718/1
See application file for complete search history.

(56) References Cited

U.S. PATENT DOCUMENTS

| | | | | |
|---|---|---|---|---|
| 9,189,765 B2 * | 11/2015 | Heydon | ............ | G06Q 10/0637 |
| 9,275,355 B2 * | 3/2016 | Birkler | ................... | G06Q 10/06 |
| 10,152,349 B1 * | 12/2018 | Anand | ................... | G06N 20/00 |
| 10,853,111 B1 * | 12/2020 | Gupta | ................. | G06F 9/45558 |
| 11,221,877 B2 * | 1/2022 | Wu | ........................ | G06F 9/5038 |
| 2014/0297833 A1 * | 10/2014 | Bedini | ................. | G06F 9/5083 |
| | | | | 709/224 |
| 2015/0339158 A1 * | 11/2015 | Harris | ....................... | G06F 9/48 |
| | | | | 718/103 |
| 2016/0350143 A1 * | 12/2016 | Uliel | .................. | G06F 9/45558 |
| 2017/0091332 A1 * | 3/2017 | Haiby-Weiss | ......... | G06F 16/50 |

(Continued)

OTHER PUBLICATIONS

Elsherbiny, et al."An extended Intelligent Water Drops algorithm for workflow scheduling in cloud computing environment" Egyptian Informatics Journal 19, 2018 pp. 33-55.*

(Continued)

*Primary Examiner* — Mehran Kamran

(74) *Attorney, Agent, or Firm* — Ryan, Mason & Lewis, LLP

(57) ABSTRACT

An apparatus comprises a processing device configured to receive a request to schedule a workload and to generate a graph representation of tasks of the workload, the graph representation comprising two or more levels each comprising nodes representing tasks of the workload. The processing device is also configured to identify a plurality of paths each representing a sequence of tasks of the workload that starts at a root node in a first level of the graph representation and traverses one or more additional nodes in one or more additional levels of the graph representation. The processing device is further configured to determine a ranking of the plurality of paths and to assign the tasks of the workload for execution on assets of an information technology infrastructure based at least in part on the determined ranking of the plurality of paths.

20 Claims, 17 Drawing Sheets

(56) References Cited

U.S. PATENT DOCUMENTS

2019/0220321 A1* 7/2019 Yang .................. H04L 41/12
2021/0176266 A1* 6/2021 Ramamurthy ........ G06F 9/5077
2022/0004433 A1* 1/2022 Vega ................. G06F 16/9024
2022/0261278 A1* 8/2022 Perneti ............ G06Q 10/06316

OTHER PUBLICATIONS

M. Velasquez et al., "An Analysis of Multi-Criteria Decision Making Methods," International Journal of Operations Research vol. 10, No. 2, May 2013, pp. 56-66.
S. Selvarani et al., "An intelligent Water Drop Algorithm for Optimizing Task Scheduling in Grid Environment," The International Arab Journal of Information Technology, vol. 13, No. 6, Nov. 2016, pp. 627-634.
A. G. F. Saif et al., "Applying IWD Algorithm for Discrete Time, Cost and Quality Trade-off in Software Projects with Expressing Quality by Defects," Journal of Emerging Trends in Computing and information Sciences, vol. 6, No. 2, Feb. 2015, pp. 119-124.
H. Shae-Hosseini, "The Intelligent Water Drops Algorithm: A Nature-inspired Swarm-based Optimization Algorithm," International Journal Bio-Inspired Computation, vol. 1, No. 1-2, 2009, pp. 71-79.
S. H. H. Madni et al., "Performance Comparison of Heuristic Algorithms for Task Scheduling in IaaS Cloud Computing Environment," PLoS One, vol. 12, No. 5, May 3, 2017, 26 pages.
A. E. Ezugwu et al., "Enhanced Intelligent Water Drops Algorithm for Multi-depot Vehicle Routing Problem," PLoS One, vol. 13, No. 3, Mar. 19, 2018, 32 pages.
W. Salabun et al., "Are MCDA Methods Benchmarkable? A Comparative Study of TOPSIS, VIKOR or, COPRAS, and PROMETHEE II Methods," Symmetry, vol. 12, No. 1549, Sep. 20, 2020, 56 pages.
R. Raihim et al, "TOPSIS Method Application for Decision Support System in Internal Control for Selecting Best Employees," 2nd International Conference on Statistics, Mathematics, Teaching, and Research, 2018, 8 pages.

* cited by examiner

| TASK | LEVEL DEPTH | VM ASSIGNED | EXECUTION START TIME | EXECUTION END TIME | TOTAL TIME TAKEN FOR EXECUTION |
|---|---|---|---|---|---|
| 0 | 1 | VM3 | 0 | 7.1 | 7.1 |
| 2 | 2 | VM3 | 7.1 | 11.8 | 4.7 |
| 1 | 2 | VM2 | 7.1 | 16.12 | 9.01 |
| 3 | 2 | VM1 | 7.1 | 18.46 | 11.36 |
| 4 | 3 | VM3 | 11.8 | 19.4 | 7.6 |
| 7 | 4 | VM3 | 19.4 | 27.93 | 8.53 |
| 5 | 3 | VM0 | 11.8 | 29.61 | 17.81 |
| 6 | 3 | VM2 | 18.46 | 31.25 | 12.79 |
| 8 | 4 | VM1 | 19.4 | 34.07 | 14.67 |
| 9 | 4 | VM3 | 27.93 | 36.81 | 8.88 |
| 10 | 4 | VM2 | 31.25 | 41.67 | 10.42 |

FIG. 9

INTELLIGENT WORKLOAD SCHEDULING USING A RANKING OF SEQUENCES OF TASKS OF A WORKLOAD

FIELD

The field relates generally to information processing, and more particularly to workload scheduling in information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant challenges can arise in the management of services in cloud-based information processing systems.

SUMMARY

Illustrative embodiments of the present invention provide techniques for intelligent workload scheduling using rankings of sequences of workload tasks.

In one embodiment, an apparatus comprises at least one processing device comprising a processor coupled to a memory. The at least one processing device is configured to perform the steps of receiving a request to schedule a workload for execution on one or more of a plurality of assets of an information technology infrastructure and generating a graph representation of a plurality of tasks of the workload, the graph representation comprising two or more levels each comprising one or more nodes each representing one of the plurality of tasks of the workload. The at least one processing device is also configured to perform the step of identifying a plurality of paths each representing a sequence of two or more of the plurality of tasks of the workload that starts at a root node in a first one of the two or more levels of the graph representation and traverses one or more additional nodes in one or more additional ones of the two or more levels of the graph representation. The at least one processing device is further configured to perform the steps of determining a ranking of the plurality of paths and assigning each of the plurality of tasks of the workload for execution on one of the plurality of assets of the information technology infrastructure based at least in part on the determined ranking of the plurality of paths.

These and other illustrative embodiments include, without limitation, methods, apparatus, networks, systems and processor-readable storage media.

BRIEF DESCRIPTION OF THE DRAWINGS

FIG. 9 shows a table illustrating task assignment using the intelligent water drop algorithm and single parameter resource ranking, according to an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
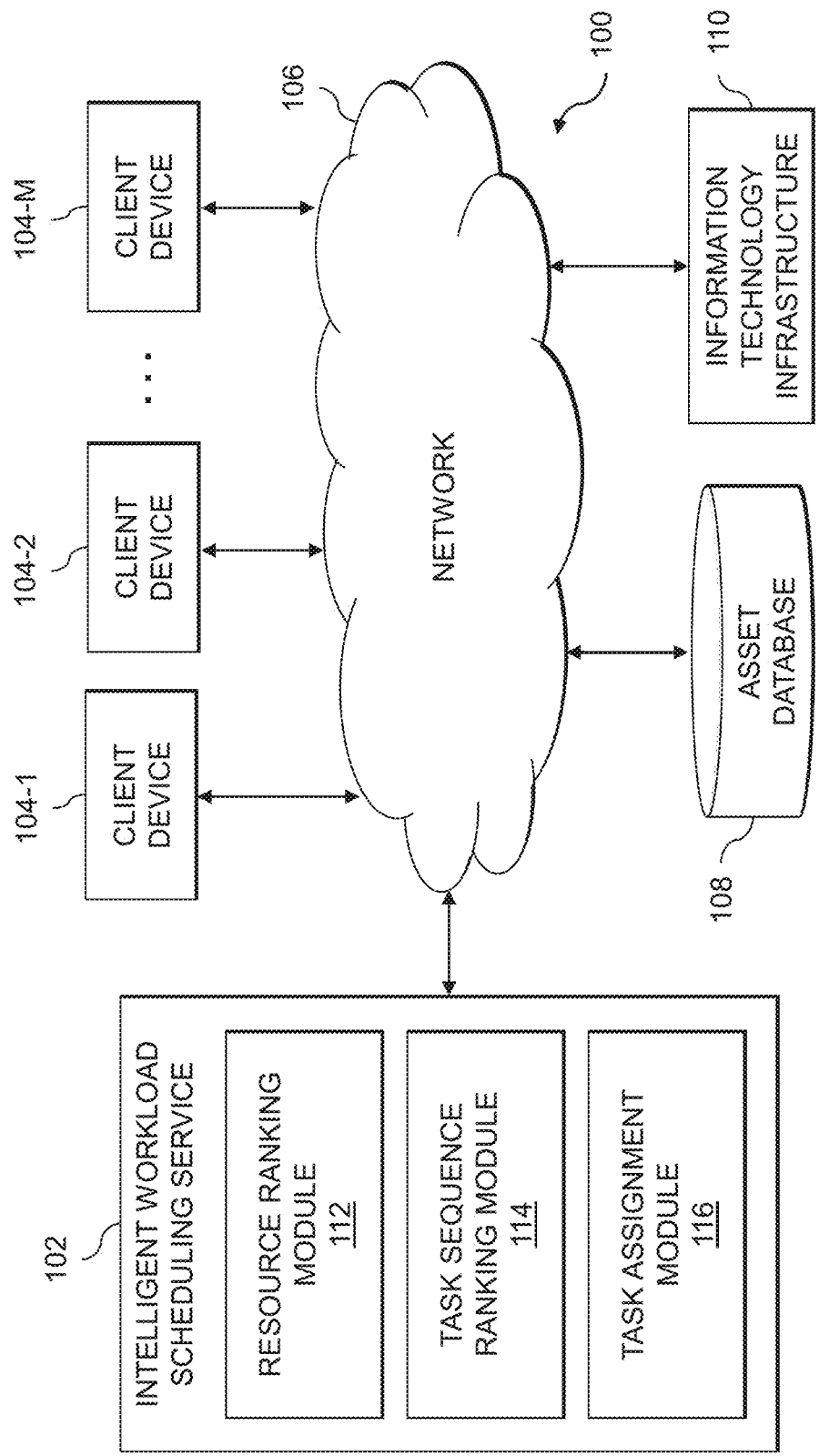
FIG. 1 is a block diagram of an information processing system for intelligent workload scheduling using rankings of sequences of workload tasks in an illustrative embodiment of the invention.

FIG. 1 shows an information processing system 100 configured in accordance with an illustrative embodiment. The information processing system 100 is assumed to be built on at least one processing platform and to provide functionality for intelligent workload scheduling using rankings of sequences of workload tasks. The information processing system 100 includes an intelligent workload scheduling service 102 and a plurality of client devices 104-1, 104-2, . . . 104-M (collectively client devices 104). The intelligent workload scheduling service 102 and client devices 104 are coupled to a network 106. Also coupled to the network 106 is an asset database 108, which may store various information relating to a plurality of assets of information technology (IT) infrastructure 110 also coupled to the network 106. The assets may include, by way of example, physical and virtual computing resources in the IT infrastructure 110. Physical computing resources may include physical hardware such as servers, storage systems, networking equipment, Internet of Things (IoT) devices, other types of processing and computing devices, etc. Virtual computing resources may include virtual machines (VMs), software containers, etc.

In the system 100, the client devices 104 are assumed to be operated by users of the resources or assets of the IT infrastructure 110. For example, the client devices 104 may utilize VMs, containers or other virtualized computing resources or other assets in the IT infrastructure 110 for running one or more workloads. The intelligent workload scheduling service 102 is configured to analyze the workloads and available assets, and to schedule tasks of the workloads for execution on different ones of the assets of the IT infrastructure 110.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, software containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The asset database 108, as discussed above, is configured to store and record information relating to various assets of the IT infrastructure 110 that is used by the intelligent workload scheduling service 102 for scheduling workloads. For example, the asset database 108 may store various information or parameters that are used to rank assets of the IT infrastructure 110. Such parameters may include, by way of example, speed, cost, power consumption, load, etc. Various other information may be stored in the asset database 108 in other embodiments as discussed in further detail below, including information related to water drop paths for tasks of workloads to be executed using assets of the IT infrastructure 110.

The asset database 108 in some embodiments is implemented using one or more storage systems or devices associated with the intelligent workload scheduling service 102. In some embodiments, one or more of the storage systems utilized to implement the asset database 108 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the intelligent workload scheduling service 102, as well as to support communication between the intelligent workload scheduling service 102 and other related systems and devices not explicitly shown.

The client devices 104 are configured to access or otherwise utilize assets of the IT infrastructure 110 to run workloads. In some embodiments, the assets (e.g., physical and virtual computing resources) of the IT infrastructure 110 are operated by or otherwise associated with one or more companies, businesses, organizations, enterprises, or other entities. For example, in some embodiments the assets of the IT infrastructure 110 may be operated by a single entity, such as in the case of a private data center of a particular company. In other embodiments, the assets of the IT infrastructure 110 may be associated with multiple different entities, such as in the case where the assets of the IT infrastructure 110 provide a cloud computing platform or other data center where resources are shared amongst multiple different entities. The term "user" herein is intended to be broadly construed so as to encompass numerous arrangements of human, hardware, software or firmware entities, as well as combinations of such entities.

In the present embodiment, alerts or notifications generated by the intelligent workload scheduling service 102 are provided over network 106 to client devices 104, or to a system administrator, information technology (IT) manager, or other authorized personnel via one or more host agents. Such host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the intelligent workload scheduling service 102. For example, a given host agent may comprise a mobile telephone equipped with a mobile application configured to receive alerts from the intelligent workload scheduling service 102 and to provide an interface for the host agent to select actions to take in response to the alert or notification.

The alerts, for example, may comprise notifications of the assets on which workloads are scheduled to run, when workloads have successfully executed, etc. The alerts may also or alternatively include proposed rankings of assets, which may be modified by end-users.

It should be noted that a "host agent" as this term is generally used herein may comprise an automated entity, such as a software entity running on a processing device. Accordingly, a host agent need not be a human entity.

The intelligent workload scheduling service 102 in the FIG. 1 embodiment is assumed to be implemented using at least one processing device. Each such processing device generally comprises at least one processor and an associated memory, and implements one or more functional modules for controlling certain features of the intelligent workload scheduling service 102. In the FIG. 1 embodiment, the intelligent workload scheduling service 102 comprises a resource ranking module 112, a task sequence ranking module 114, and a task assignment module 116.

The intelligent workload scheduling service 102 is configured to receive requests to execute workloads on assets of the IT infrastructure 110. Such requests may be received from the client devices 104. The resource ranking module 112 is configured to rank assets of the IT infrastructure 110 (e.g., based on one or more parameters such as speed, cost, power consumption, load, etc.). The task sequence ranking module 114 is configured to generate graph representations of pluralities of tasks of the workloads. The graph representation for a given workload comprises two or more levels each comprising one or more nodes each representing one of the tasks of that given workload. The task sequence ranking module 114 is also configured to identify a plurality of paths each representing a sequence of two or more tasks of a workload that starts at a root node in a first one of the two or more levels of the graph representation for the given workload and traverses one or more additional nodes in one or more additional ones of the two or more levels of the graph representation for the given workload. The task sequence ranking module 114 is further configured to determine a ranking of the plurality of paths in the graph representation of the given workload. To do so, the task sequence ranking module 114 may utilize an intelligent water drops meta-heuristic algorithm. The task assignment module 116 is configured to assign each of the plurality of tasks of the given workload for execution on one of the plurality of assets of the IT infrastructure 110 based at least in part on the determined ranking of the plurality of paths and the determined ranking of the plurality of assets of the IT infrastructure 110.

It is to be appreciated that the particular arrangement of the intelligent workload scheduling service 102, client devices 104, asset database 108 and IT infrastructure 110 illustrated in the FIG. 1 embodiment is presented by way of example only, and alternative arrangements can be used in other embodiments. For example, the intelligent workload scheduling service 102, or one or more portions thereof such as the resource ranking module 112, the task sequence ranking module 114, and the task assignment module 116, may in some embodiments be implemented internal to one or more of the client devices 104 or the IT infrastructure 110. As another example, the functionality associated with the resource ranking module 112, the task sequence ranking module 114, and the task assignment module 116 may be combined into one module, or separated across more than three modules with the multiple modules possibly being implemented with multiple distinct processors or processing devices.

At least portions of the resource ranking module 112, the task sequence ranking module 114, and the task assignment module 116 may be implemented at least in part in the form of software that is stored in memory and executed by a processor.

It is to be understood that the particular set of elements shown in FIG. 1 for intelligent workload scheduling using rankings of sequences of workload tasks is presented by way of illustrative example only, and in other embodiments additional or alternative elements may be used. Thus, another embodiment may include additional or alternative systems, devices and other network entities, as well as different arrangements of modules and other components.

The intelligent workload scheduling service 102, and other portions of the system 100, in some embodiments, may be part of cloud infrastructure as will be described in further detail below. The cloud infrastructure hosting the intelligent workload scheduling service 102 may also host any combination of the intelligent workload scheduling service 102, one or more of the client devices 104, the asset database 108 and the IT infrastructure 110.

The intelligent workload scheduling service 102 and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources.

The client devices 104 and the intelligent workload scheduling service 102 or components thereof (e.g., the resource ranking module 112, the task sequence ranking module 114, and the task assignment module 116) may be implemented on respective distinct processing platforms, although numerous other arrangements are possible. For example, in some embodiments at least portions of the intelligent workload scheduling service 102 and one or more of the client devices 104 are implemented on the same processing platform. A given client device (e.g., 104-1) can therefore be implemented at least in part within at least one processing platform that implements at least a portion of the intelligent workload scheduling service 102. Similarly, at least a portion of the intelligent workload scheduling service 102 may be implemented at least in part within at least one processing platform that implements at least a portion of the IT infrastructure 110.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the intelligent workload scheduling service 102, the client devices 104, the asset database 108 and the IT infrastructure 110, or portions or components thereof, to reside in different data centers. Numerous other distributed implementations are possible. The intelligent workload scheduling service 102 can also be implemented in a distributed manner across multiple data centers.

Additional examples of processing platforms utilized to implement the intelligent workload scheduling service 102 in illustrative embodiments will be described in more detail below in conjunction with FIGS. 16 and 17.

It is to be appreciated that these and other features of illustrative embodiments are presented by way of example only, and should not be construed as limiting in any way.

An exemplary process for intelligent workload scheduling using rankings of sequences of workload tasks will now be described in more detail with reference to the flow diagram of FIG. 2. It is to be understood that this particular process is only an example, and that additional or alternative processes for intelligent workload scheduling using rankings of sequences of workload tasks can be carried out in other embodiments.

In this embodiment, the process includes steps 200 through 208. These steps are assumed to be performed by the intelligent workload scheduling service 102 utilizing the resource ranking module 112, the task sequence ranking module 114, and the task assignment module 116. The process begins with step 200, receiving a request to schedule a workload for execution on one or more of a plurality of assets of an IT infrastructure (e.g., IT infrastructure 110). The plurality of assets of the IT infrastructure may comprise virtualized computing resources, the virtualized computing resources comprising at least one of one or more VMs and one or more software containers. In step 202, a graph representation of a plurality of tasks of the workload is generated. The graph representation comprises two or more levels, each of the two or more levels comprising one or more nodes each representing one of the plurality of tasks of the workload. The graph representation may comprise a directed acyclic graph.

A plurality of paths in the graph representation are identified in step 204. Each of the plurality of paths represents a sequence of two or more of the plurality of tasks of the workload that starts at a root node in a first one of the two or more levels of the graph representation and traverses one or more additional nodes in one or more additional ones of the two or more levels of the graph representation. In step 206, a ranking of the plurality of paths is determined. In some embodiments, step 206 utilizes an intelligent water drops meta-heuristic algorithm. Step 206 may include determining a sub-graph value for each node in the graph representation, the sub-graph value for a given node in a given one of the two or more levels of the graph representation representing a number of other nodes in one or more other levels of the graph representation below the given level that the given node is connected to, and assigning a decision condition value to each node in the graph representation. Nodes in the graph representation having a non-zero sub-graph value are assigned a first decision condition value, and nodes in the graph representation having a zero sub-graph value are assigned a second decision condition value different than the first decision condition value.

Step 206 may comprise performing two or more iterations of identifying a top remaining one of the plurality of paths from the root node to a sink node in a given one of the two or more levels in the graph representation, where the sink node comprises a node that is not connected to one or more additional nodes in another one of the two or more levels in the graph representation lower than the given level in the graph representation. In each subsequent one of the two or more iterations following one or more previous ones of the two or more iterations, the sink node of the top remaining one of the plurality of paths identified in each of the one or more previous ones of the two or more iterations is removed from the graph representation.

Identifying the top remaining one of the plurality of paths in each of the two or more iterations may comprise, starting at the root node in the first level of the graph representation, identifying a set of one or more possible paths to a next node in a next one of the two or more levels of the graph representation, calculating a probability of visiting each of the set of one or more possible paths, and selecting one of the next nodes in the next level of the graph representation based at least in part on the calculated probabilities of visiting each of the set of one or more possible paths. The identifying, calculating and selecting are repeated starting from the selected next node until a sink node is reached. Calculating the probability of visiting a given one of the set of one or more possible paths to a given one of the next nodes is based on a ratio of a state measurement for the given next node to a sum of the state measurements for the set of one or more possible paths, wherein the state measurement for the given next node is based at least in part on (i) a sub-graph value for the given next node and (ii) a decision condition value assigned to the given next node. Repeating the identifying of the set of one or more possible paths starting from the selected next node utilizes an updated state measurement for the selected next node, the updated state measurement being based at least in part on a time taken for execution of a given one of the plurality of tasks corresponding to the selected next node.

Figure 2:
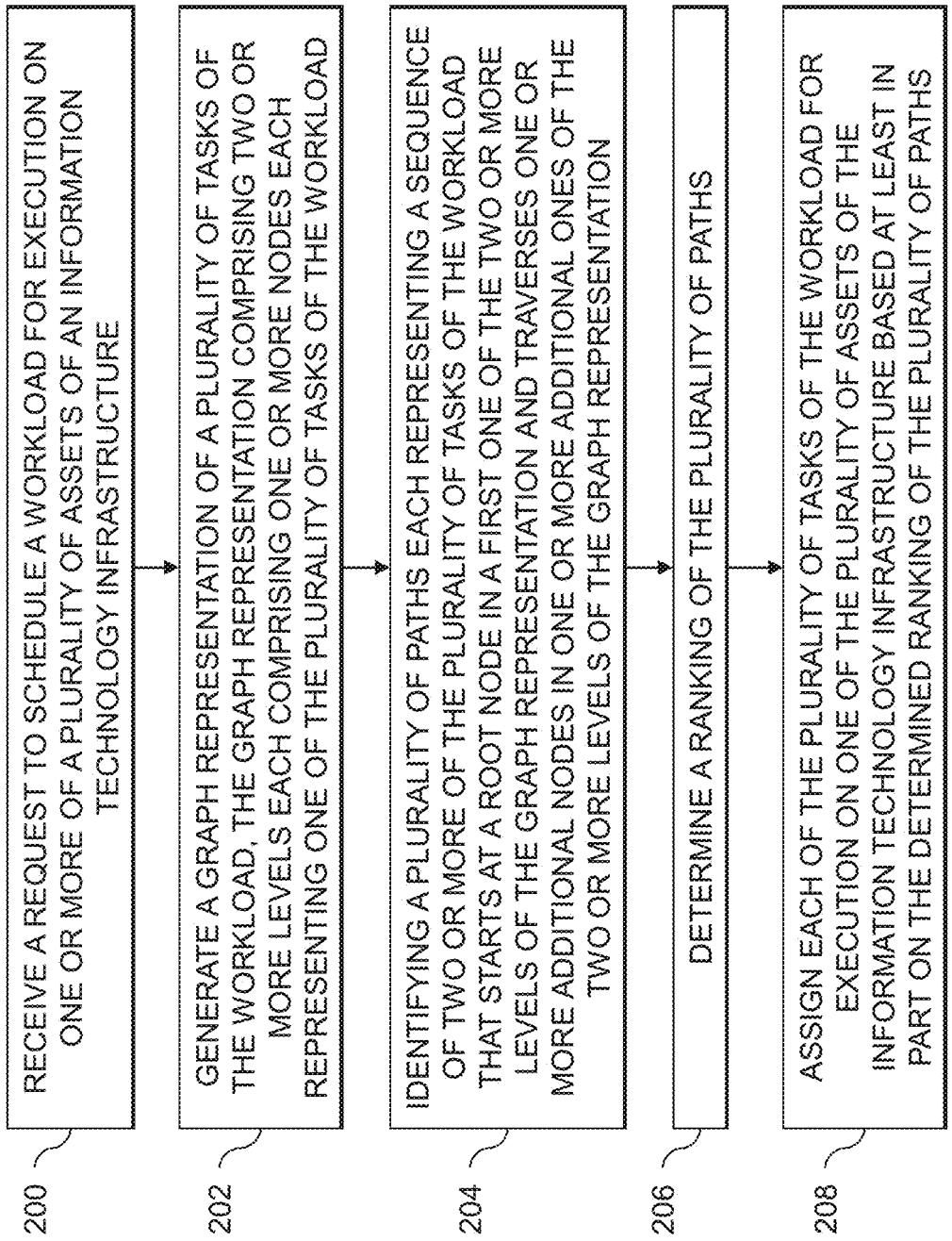
FIG. 2 is a flow diagram of an exemplary process for intelligent workload scheduling using rankings of sequences of workload tasks in an illustrative embodiment.

The FIG. 2 process continues with step 208, assigning each of the plurality of tasks of the workload for execution on one of the plurality of assets of the IT infrastructure based at least in part on the determined ranking of the plurality of paths. Step 208 may be further based at least in part on a ranking of the plurality of assets of the IT infrastructure. The ranking of the plurality of assets of the IT infrastructure may be according to a single parameter such as speed, where the speed of a given asset comprises a number of instructions capable of being executed within a designated time frame. The ranking of the plurality of assets of the IT infrastructure may alternatively be according to two or more parameters, where the two or more parameters including one or more of speed, cost, power consumption, load, etc. The ranking of the plurality of assets of the IT infrastructure according to the two or more parameters may be determined utilizing a Technique for Order of Preference by Similarity to Ideal Solution (TOPSIS) algorithm. Step 208 may include assigning the plurality of tasks of the workload level by level in the two or more levels of the graph representation, where for each level tasks are assigned in an order determined by the ranking of the plurality of paths to an available one of the plurality of assets in an order determined by the ranking of the plurality of assets.

As described above, cloud computing continues to grow in popularity. Many organizations have already started using cloud services, as it can provide various benefits including but not limited to ease of management, cost benefits, instant access to a wide variety of services, etc. Due to increase in demand, cloud service providers are competing with one another using various strategies, such as a strategy of offering cost-friendly access to cloud computing services. One important factor in cloud computing or other virtualized computing environments is handling resources (e.g., virtual machines, software containers, etc.) efficiently and intelligently. Among the factors that fall under the broad category or resource handling is workload scheduling to available resources. Selection of a proper workload scheduling technique can provide numerous advantages, enhancing the efficiency of the whole cloud computing system or other virtualized computing environment in which the workloads are scheduled.

Optimized scheduling of tasks can be seen as an NP-hard problem, and various types of approaches may be used or applied to task scheduling. For example, heuristic approaches may be used, but such approaches fail to handle this NP-hard problem efficiently. As another example, metaheuristic approaches may be used, but such approaches are generally limited due to many drawbacks including the inability to handle multi-parameter optimization. Heuristic and metaheuristic approaches include Monte Carlo Tree Search (MCTS), First Come First Serve (FCFS), Round Robin (RR), Max-Min, Min-Min, Genetic, Simulated Annealing, etc. Such approaches suffer from key drawbacks. MCTS approaches, for example, cause server load imbalance. FCFS approaches have longer waiting times, especially for shorter jobs. RR approaches have a high average waiting time, and a high dependency on the size of the time quantum. MAX-MIN approaches have earlier execution of larger tasks that may increase the total response time. In MIN-MIN approaches, if the number of smaller tasks exceeds larger tasks then the makespan of the schedule is determined by larger tasks. Genetic approaches have higher times for convergence. Simulated annealing approaches are slow processes due to repeated annealing.

Illustrative embodiments are able to overcome the above and other drawbacks of conventional approaches through the use of a novel, nature inspired metaheuristic-based approach for workload scheduling based on single and multi-parameter optimization. Some embodiments, for example, implement a novel nature inspired metaheuristic-based approach for workload scheduling that is referred to herein as an Intelligent Water Drops (IWD) algorithm. IWD may be used for solving optimization and complex scientific problems. IWD is inspired by the flow of natural water drops in lakes, rivers, and seas, where a water stream goes through an optimum path to reach its final destination (e.g., a lake, a sea, etc.). In an IWD algorithm, each "water drop" or WD travels from a source to a destination. The source, in this context of workload scheduling, may be a root node of a graph structure representing sequences of tasks of a workload, with the destination being a sink node (e.g., a node without any "child" nodes) in the graph structure. As a WD "travels" from the source to the destination, it picks paths based on the "soil" of different nodes in the graph structure. The value of the "soil" in the context of workload scheduling may be representative of the probability of visiting next nodes in the graph structure. For example, the value of the soil for a given node (e.g., representing a task of a workload) may be based at least in part on a state of the given node, where the state is based at least in part on a number of connections which the given node has in the graph structure (e.g., the soil value for the given node may be based at least in part on the number of child nodes, grandchild nodes, etc. that are connected to the given node).

For single parameter optimization, intelligent workload scheduling uses the IWD algorithm. To perform intelligent and efficient multi-parameter optimization-based workload scheduling, a Multi Criteria Decision Making (MCDM) approach is applied or integrated with the IWD algorithm. Although various embodiments are described below in the context of application of the IWD algorithm to task or workload scheduling in cloud computing or other virtualized computing environments, the IWD algorithm and techniques described herein for single and multi-parameter optimization may be extended to various other use cases, including but not limited to unmanned vehicle travel path construction, Steiner tree problems, robot path planning problems, etc.

Figure 3:
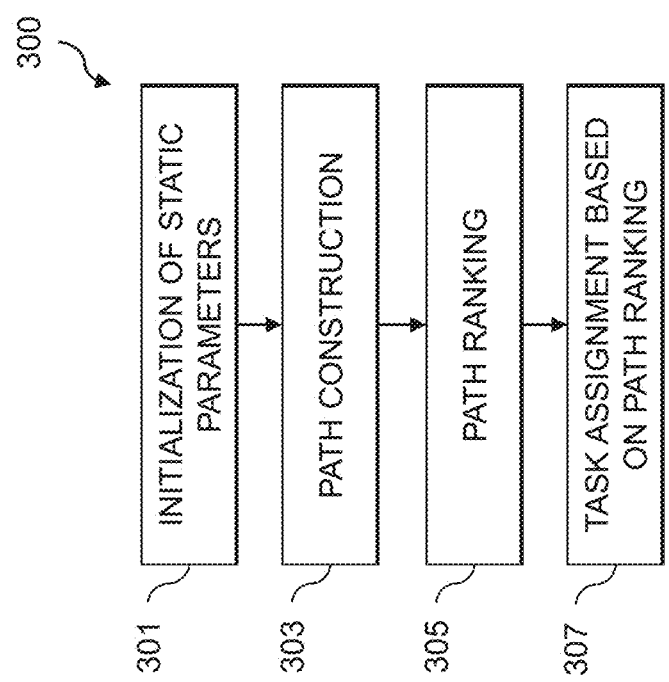
FIG. 3 shows a process flow for implementing an intelligent water drop algorithm, according to an illustrative embodiment.
Figure 4:
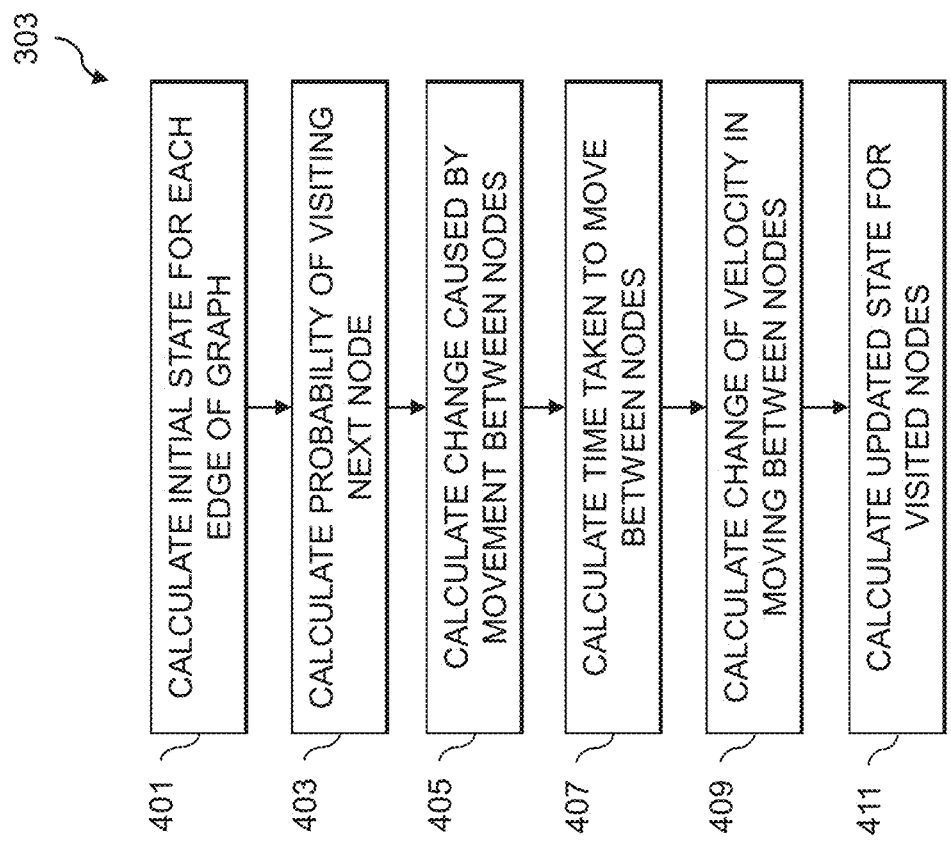
FIG. 4 shows a process flow for path construction, according to an illustrative embodiment.

As described above, some embodiments utilize a new algorithm, referred to as IWD, for intelligent workload scheduling. FIG. 3 shows an overall view 300 of different stages or phases of the IWD algorithm. The IWD algorithm begins in stage 301 with initialization of static parameters. In step 303, paths are constructed in a graph structure that represents sequences of tasks of a workload. These paths may be referred to as water drop or WD paths, and thus stage 303 may represent WD path construction. In stage 305, the different paths are ranked as discussed in further detail below. Tasks are then assigned based on the path rankings in step 307. FIG. 4 illustrates the path construction stage 303 in further detail. In step 401, the initial state on each edge of the graph is calculated. The initial state may also be referred to as the initial soil for each edge of the graph. The state or soil value may be calculated according to the following Equation (1):

$$\text{Soil}(i,j) = \max((a^*\text{subgraph}(j) + b^*\text{condition}(j)), 1)$$

In step 403, the probability of visiting a next node is calculated. Step 403 may use the following Equation (2) for calculating probability values:

$$P(i, j) = \frac{\text{Soil }(i, j)}{\sum [\text{Soil }(i, j)]}$$

The change caused by movement between nodes (e.g., the soil change caused by movement of a WD from a first node to a second node) is then calculated in step 405. This change may be referred to as the soil that is carried by a WD traveling between the first and second nodes, and may be calculated using the following Equation (3):

$$\Delta \text{Soil }(i, j) = \frac{as}{[bs + cs * \text{Time }(i, j)]}$$

where as, bs and cs represent WD soil updating parameters, and are constants. The time taken to move between nodes is calculated in step 407. The time taken to move between nodes may be referred to as the time it takes for the WD to move between a first node and a second node. Step 407 may use the following Equation (4) for calculating the time taken by the WD:

$$\text{Time }(i, j) = \frac{(\text{subgraph }(i) - \text{subgraph }(j))}{Vel(WD)}$$

where Vel(WD) is the velocity of the WD. The change in velocity in moving between nodes, also referred to as the change in velocity of the WD, is calculated in step 409. Step 409 may use the following Equation (5) for calculating the change in velocity of the WD:

$$\Delta Vel(i, j) = Vel(WD) + \frac{av}{[bv + cv * \text{Soil }(i, j)]}$$

where av, bv and cv represent WD velocity updating parameters. In step 411, the updated state for the visited nodes, also referred to as the updated soil, is calculated. Step 411 may use the following Equation (6) for calculating the updated soil:

$$\text{Updated Soil}(i,j) = (1-p)\text{Soil}(i,j) - p*\Delta\text{Soil}(i,j)$$

where p is a constant. In some embodiments, the WD velocity updating parameters av, bv and cv are set to 0.1, and the initial velocity of the WD, Vel(WD), is set to 100. a may be set to 2, while b is set to 1. It should be appreciated, however, that these particular values for various parameters in the above equations are given by way of example only, and that embodiments are not limited to use with these specific examples. The IWD algorithm described with respect to FIGS. 3 and 4 may be applied for single and multiple parameter optimization to provide an intelligent workload scheduling algorithm.

Figure 5:
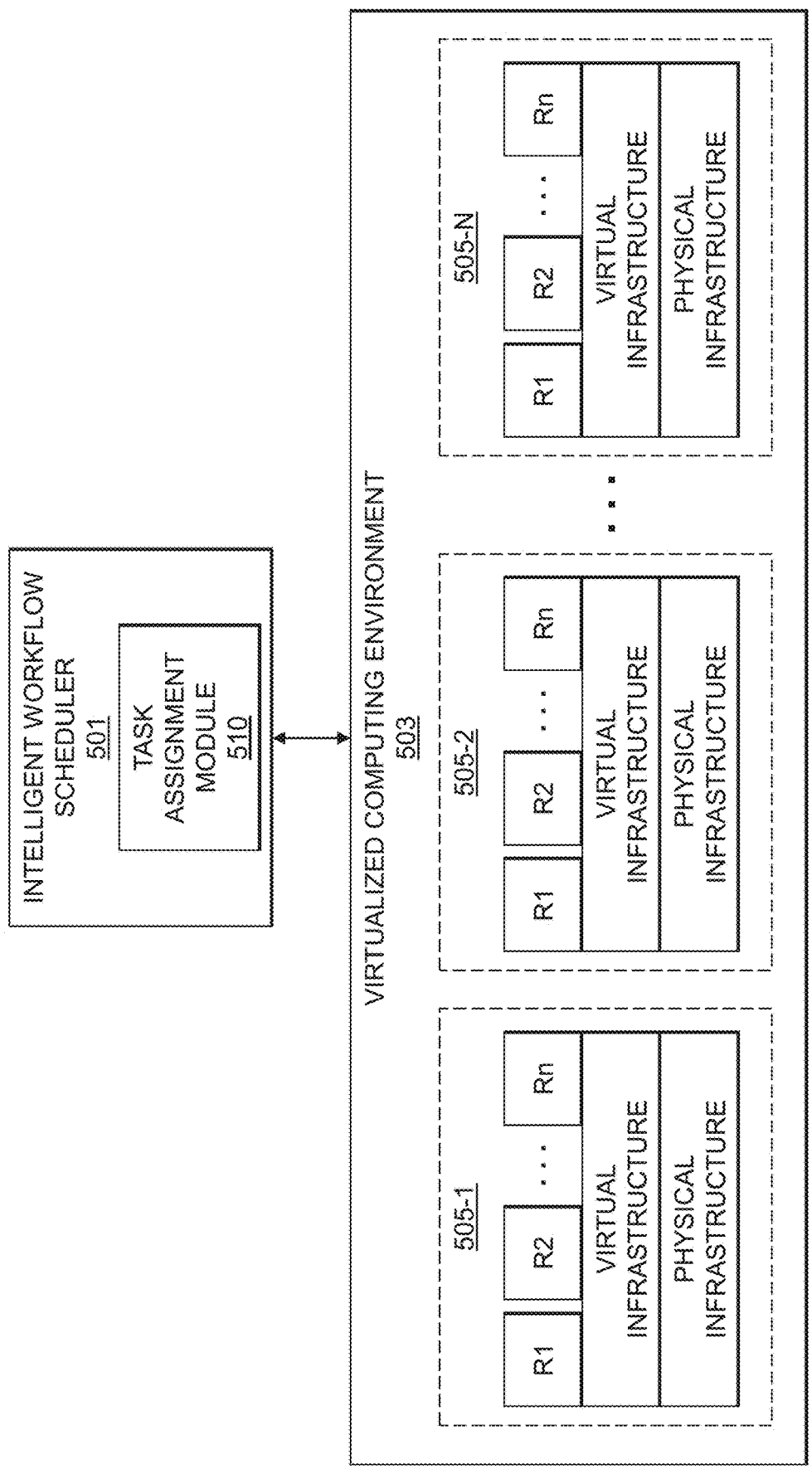
FIG. 5 illustrates an intelligent workflow scheduler configured to assign tasks to resources in a virtualized computing environment using single parameter optimization, according to an illustrative embodiment.

FIG. 5 illustrates use of an intelligent workflow scheduler 501 that performs workflow scheduling utilizing a task assignment module 510 on a virtualized computing environment 503. The task assignment module 510 uses the IWD algorithm and single parameter optimization. The virtualized computing environment 503 is assumed to include a set of virtual resources 505-1, 505-2, . . . 505-N (collectively, virtual resources 505). Each set of virtual resources (R1, R2, . . . Rn) is implemented using virtual infrastructure (also referred to as virtualization infrastructure) that runs in physical infrastructure. The virtual resources may comprise VMs, software containers, etc. FIG. 16, discussed below, provides additional detail regarding a processing platform that implements VMs and/or container sets using virtualization infrastructure running on physical infrastructure.

For single parameter optimization, some embodiments use a parameter "makespan" that is also referred to as completion time. Makespan or completion time refers to the total time taken to process a set of jobs or workloads for its complete execution. Here, the goal for optimization is to obtain a minimum makespan for a given workflow to be executed. A workflow may include one or more jobs or workloads. For ease of illustration, consider a simplified virtualized computing environment 503 that includes four virtualized resources, namely, four VMs denoted VM0, VM1, VM2 and VM3 with associated speeds (in terms of millions of instructions per second (MIPS)) of 550, 600, 725 and 850, respectively. For evaluation, workflows or workloads to be executed on these VMs are considered. A workflow or workload can be defined as a sequence of tasks that processes a set of data. In some embodiments, the IWD algorithm utilizes workflows that are represented in a Directed Acyclic Graph (DAG) format.

Figure 6:
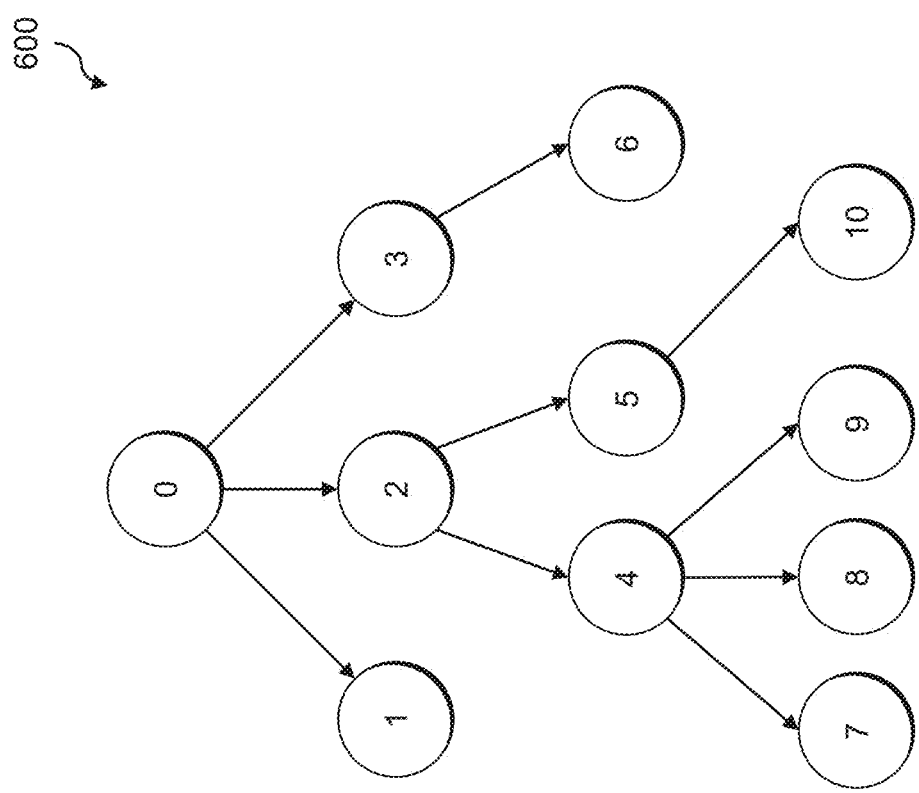
FIG. 6 shows an example of a workflow represented in a directed acyclic graph format, according to an embodiment of the invention.

FIG. 6 shows an example workflow 600 in the DAG format. As described above, a workflow can be defined as a sequence of tasks that processes a set of data. The workflow 600 includes tasks represented as nodes 0 through 10. The IWD algorithm is applied to the workflow 600 as described below. In the first step, path construction is performed to identify the best path. First, the sub-graph value of each node in the workflow 600 is calculated. The sub-graph value for a particular node is the total number of nodes (e.g., child, grandchild, etc.) it is connected to. The sub-graphs for the nodes 0 through 10 in the workflow 600 are as follows: Node(0)=10, Node(1)=0, Node(2)=6, Node(3)=1, Node(4)=3, Node(5)=1, Node(6)=0, Node(7)=0, Node(8)=0, Node(9)=0, Node(10)=0. Next, a "decision condition" is calculated for each node. Nodes which have a non-zero sub-graph value are tagged with decision condition 1, and nodes which have a zero sub-graph value are tagged with decision condition 0. Thus, for the workflow 600 the decision condition for nodes 0, 2, 3, 4 and 5 is "1" while the decision condition for nodes 1, 6, 7, 8, 9 and 10 is "0."

The water drop or WD will now start processing from the root node (e.g., node 0 in the workflow 600) and travels through the tree path. The WD in the workflow 600 will have three paths that can be taken from the root node 0. For example, node 0 in the workflow 600 can go to node 1, node 2 or node 3. The IWD algorithm next calculates the soil along all the possible paths for node 0 (e.g., using the Equation (1) described above). The soil values for the three possible paths for node 0 are shown below:

$$\text{Soil}(0,1) = \max(((2*0)+(1*0)), 1) = 1$$

$$\text{Soil}(0,2) = \max(((2*6)+(1*1)), 1) = 13$$

$$\text{Soil}(0,3) = \max(((2*1)+(1*1)), 1) = 3$$

The IWD algorithm next calculates the probability of each WD path at node 0 in the workflow 600 visiting each possible node (e.g., using the Equation (2) described above). The probability values for the three possible paths for node 0 are shown below:

$$P(0, 1) = \frac{1}{17} = 0.05$$

$$P(0, 2) = \frac{13}{17} = 0.76$$

$$P(0, 3) = \frac{3}{17} = 0.17$$

From the above probability values, it is clear in the FIG. 6 example that the probability of the WD at node 0 visiting node 2 is higher than other available nodes (e.g., node 1 and node 3). Due to the WD movement from node 0 to node 2, there is a change in soil. To calculate the updated soil, the IWD algorithm calculates the soil carried by the WD with it during movement (e.g., ΔSoil), the time taken for the WD to travel between nodes (e.g., Time), and the change in velocity along the selected path (e.g., ΔVel). These calculations may be performed using Equations (3), (4) and (5) described above. The values for this example are shown below:

$$\Delta\text{Soil}(0, 2) = \frac{1}{1 + (1*0.04)} = 0.96$$

$$\text{Time}(0, 2) = \frac{10 - 6}{17} = 0.04 sec$$

$$\Delta Vel(0, 2) = 100 + \frac{1}{1 + (1*13)} = 100.07$$

The updated soil is then calculated (e.g., using Equation (6) described above). Continuing with the above example, the updated soil is determined as follows:

$$\text{Updated Soil}(0,2) = (1-0.1)*13 - (0.1*0.96) = 11.604$$

The final soil at this step for the WD is 0.96.

At this point, the WD is at node 2. From node 2, the WD has two possible nodes to select (e.g., node 4 or node 5). To identify which node is picked for the WD to travel, the above-described calculations are repeated. The calculations for Equations (1) and (2) are shown below:

$$\text{Soil}(2, 4) = \max(((2*3) + (1*1)), 1) = 7$$

$$\text{Soil}(2, 5) = \max(((2*1) + (1*1)), 1) = 3$$

$$P(2, 4) = \frac{7}{10} = 0.7$$

$$P(2, 5) = \frac{3}{10} = 0.3$$

From the above probability values, the next node to be visited is node 4. The calculations for Equations (3) through (6) are then performed, with the results shown below:

$$\text{Time}(2, 4) = \frac{3}{100} = 0.03 \text{sec}$$

$$\Delta\text{Soil}(2, 4) = 0.97$$

$$\Delta Vel(0, 2) = 100 + \frac{1}{1 + (1*7)} = 100.125$$

$$\text{Updated Soil}(0, 2) = 6.203$$

The final soil for the WD at this point is then calculated as a sum of the previous value and the new ΔSoil:

Final Soil(WD)=Soil(WD)+Soil(2,4)=0.96+0.97=1.93

Figure 7:
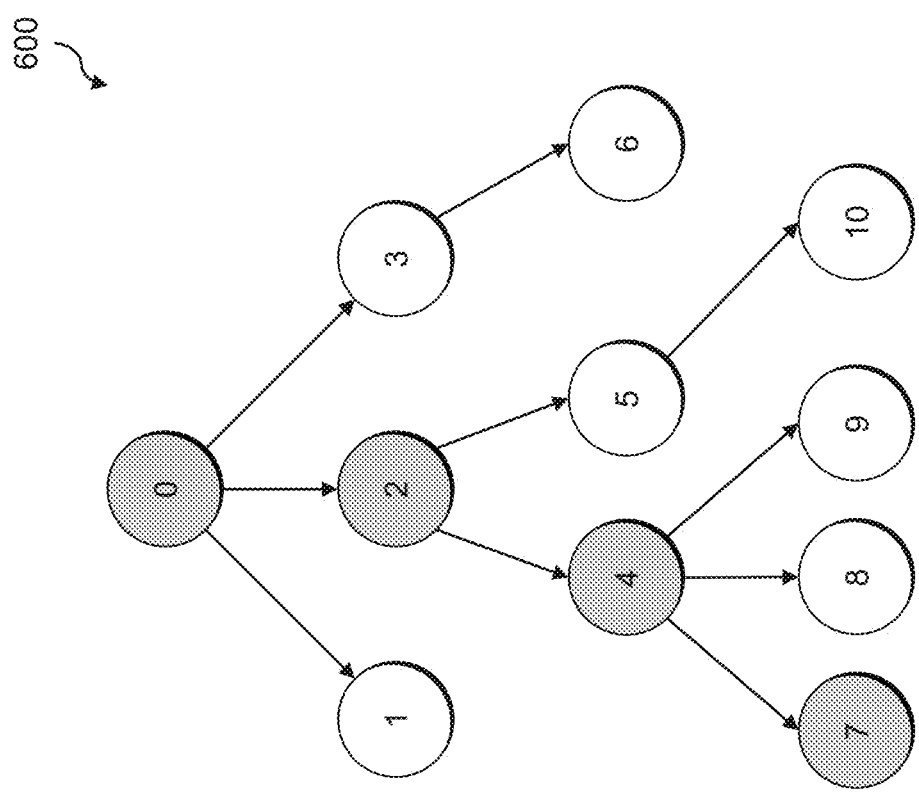
FIG. 7 shows a best water drop path in an example workflow, according to an embodiment of the invention.

The WD is now at node 4 and as per the workflow 600, the WD has three possible nodes to select: node 7, node 8 or node 9. To identify which node is picked up for the WD to travel, the above-mentioned calculations are repeated. In this iteration, node 7 has more probability to be visited than node 8 or node 9. Once the WD reaches node 7, the IWD algorithm stops processing as the WD at node 7 does not have any possible child nodes to be visited. Thus, the WD in this example travels from node 0→node 2→node 4→node 7. This represents the "best path" for the WD, also referred to as WD_Path$_{best}$. The IWD algorithm uses this path for intelligently assigning workloads to different resources (e.g., different VMs or other virtual resources such as containers in the virtualized computing environment 503). FIG. 7 illustrates the workflow 600, where the nodes in the WD_Path$_{best}$ are highlighted with grayscale shading.

Figure 8:
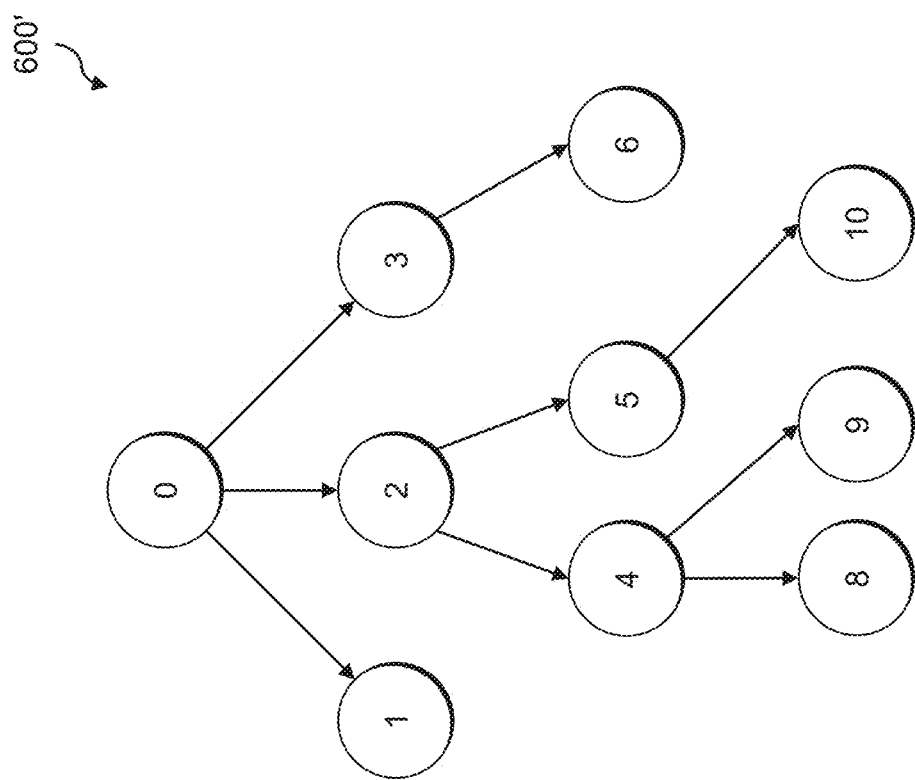
FIG. 8 shows an updated workflow represented in a directed acyclic graph format for use in a subsequent iteration of the intelligent water drop algorithm having a final node in the best water drop path from a previous iteration removed, according to an illustrative embodiment.

The IWD algorithm will then repeat the WD processing from the root node (e.g., node 0) until it identifies all the paths in the given workflow. Each time the IWD starts WD processing from the root node, the last identified node in the previous iteration is removed from the workflow. Continuing the above example, node 7 is removed from the DAG and an updated workflow 600' is re-processed for the WD as shown in FIG. 8. In this iteration, the WD_Path$_{best}$ is identified as node 0→node 2→node 4→node 8. In subsequent iterations, the WD_Path$_{best}$ is identified as: node 0→node 2→node 4→node 9; node 0→node 2→node 5→node 10; node 0→node 3→node 6; node 0→node 1.

Following the path construction phase, the intelligent workflow scheduler 501 uses the task assignment module 510 to start assigning tasks to the virtual resources in the virtualized computing environment 503. For simplicity below, it is assumed that the tasks are assigned to VMs, but it should be appreciated that in other embodiments, the virtual resources may comprise containers, combinations of VMs and containers, etc. The task assignment module 510 assigns tasks level by level to the VMs (or other virtual resources), where the VMs have different speeds. For ease of illustration, again consider the simplified virtualization computing environment 503 that includes four virtualized resources, namely, four VMs denoted VM0, VM1, VM2 and VM3 with associated speeds (in terms of MIPS) of 550, 600, 725 and 850, respectively. The WD_Path$_{best}$ is considered for task assignment. The intelligent workflow scheduler 501 first assigns the task of the root node of the WD_Path$_{best}$ (e.g., node 0) to the fastest VM in the virtualized computing environment 503 (e.g., VM3 in the simplified example described above).

The task assignment module 510 then verifies if there are any other tasks at the same level as the current node (e.g., node 0). Since there are no other tasks at the same level as node 0 in the workflow 600, the task assignment module 510 moves to the next level and picks up the node as per the WD_Path$_{best}$. In this case, node 2 comes next. Since the task at node 2 is dependent on node 0 in the workflow 600, the task start time for node 2 is dependent on node 0 (e.g., the task start time for node 2 is the task end time of node 0). The task at node 2 is assigned to the fastest VM available (e.g., VM3, as VM3 is idle now that it has completed execution of the task at node 0). The intelligent workflow scheduler 501 now verifies if there are any other tasks at the same level as node 2 which are to be assigned. In this example, the tasks at node 1 and node 3 are un-assigned, and thus the task assignment module 510 assigns these tasks to the next fastest VMs available (e.g., VM2 and VM1).

The above process repeats until all the tasks in the workflow 600 are assigned. The results of the complete task assignments are shown in the table 900 of FIG. 9. As illustrated in the table 900, the tasks corresponding to the nodes present in the WD_Path$_{best}$ are assigned to the fastest VM in the environment (e.g., VM3). The total time taken for execution of the workflow 600 is referred to as the makespan. By applying the IWD algorithm to the workflow 600, the makespan value is 41.67 seconds. Workflow simulation tools are used to compare the IWD algorithm with MCTS, FCFS, RR, MAX-MIN and MIN-MIN workflow scheduling algorithms. For the workflow 600, the makespan using the IWD algorithm (41.67 seconds) is better than the makespan using MCTS (43.09 seconds), FCFS (108.17 seconds), RR (50.33 seconds), MAX-MIN (57.41 seconds) and MIN-MIN (57.92 seconds).

Figure 10:
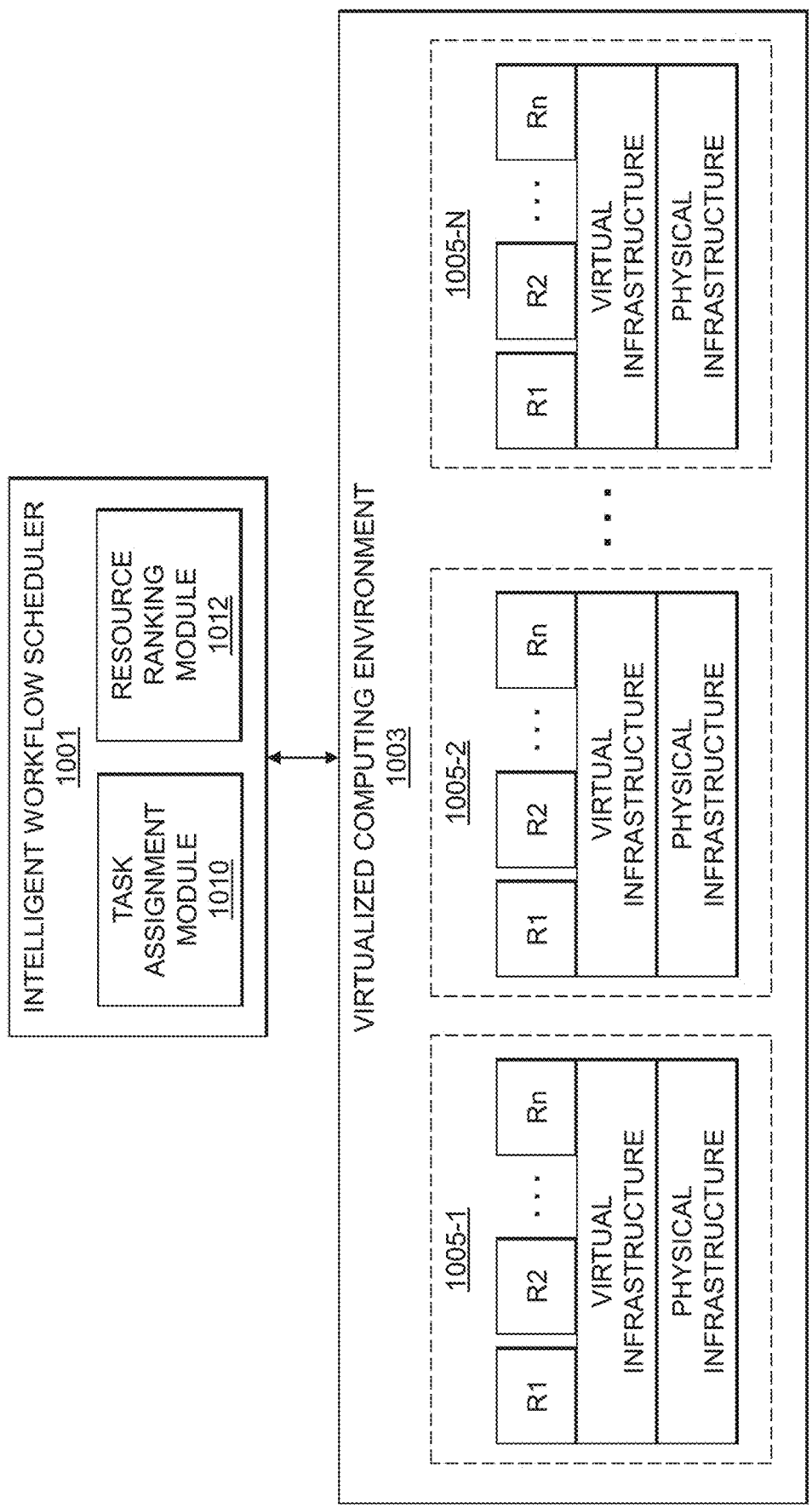
FIG. 10 illustrates an intelligent workflow scheduler configured to assign tasks to resources in a virtualized computing environment using multi-parameter optimization, according to an illustrative embodiment.

FIG. 10 illustrates use of an intelligent workflow scheduler 1001 that performs workflow scheduling on a virtualized computing environment 1003. The intelligent workflow scheduler 1001 includes a task assignment module 1010 and a resource ranking module 1012 configured to use an MCDM approach for performing intelligent and efficient workload scheduling using the above-described IWD algorithm. The virtualized computing environment 1003, similar to the virtualized computing environment 503, is assumed to include a set of virtual resources 1005-1, 1005-2, . . . 1005-N (collectively, virtual resources 1005). Each set of virtual resources (R1, R2, . . . Rn) is implemented using virtual infrastructure (also referred to as virtualization infrastructure) that runs in physical infrastructure. The virtual resources may comprise VMs, software containers, etc. FIG. 16, discussed below, provides additional detail regarding a processing platform that implements VMs and/or container sets using virtualization infrastructure running on physical infrastructure.

The task assignment module 1010 of the intelligent workflow scheduler 1001 performs IWD path construction, and then assigns tasks to VMs, software containers or other virtual resources in the virtualized computing environment 1003 using the resource ranking module 1012. While there may be multiple parameters selected for optimization, for clarity of illustration two parameters (e.g., makespan and cost) are considered. It should be appreciated, however, that in other embodiments different parameters may be optimized, more than two parameters may be optimized, combinations thereof, etc. Again, a simplified virtualized computing environment 1003 is considered, which includes four VMs denoted VM0, VM1, VM2 and VM3 having associated speeds (in MIPS) of 550, 600, 725 and 850. The intelligent workflow scheduler 1001, via the resource ranking module 1012, further considers the cost plan which charges end-users depending on the type of VM or other resources used. Consider, as an example, a cost plan that is charged based on hourly usage and that the charges are already given or available.

Figure 11:
FIG. 11 shows a table illustrating multiple criteria and parameters for resource ranking, according to an illustrative embodiment.

FIG. 11 shows a table 1100 of multiple criteria and parameters for the four VMs assumed to be used in the simplified virtualized computing environment 1003. The table 1100 shows the resources, as well as parameters of speed and cost. The table 1100 may also include columns for various additional parameters (e.g., power consumption, load balancing, geographic location, availability of security features, cloud service provider, etc.). As noted above, in other embodiments such additional parameters may be optimized in addition to or in place of one or more of speed and cost.

Conventional approaches to workload scheduling fail to handle multi-parameter optimization-based workload scheduling. In illustrative embodiments, an MCDM approach is used to perform intelligent and efficient workload scheduling. MCDM is in general classified into two categories: multi attribute decision making and multi objective decision making. Workload scheduling may be considered as a multi attribute decision making problem, as the decision space will have finite alternatives. Various statistical methods may be used for solving a multi attribute decision making problem, including but not limited to Analytical Hierarchy Process (AHP), Technique for Order of Preference by Similarity to Ideal Solution (TOPSIS), VlseKriterijumska Optimizacija I Kompromisno Resenje (VIKOR), Preference Ranking Organization Method for Enrichment Evaluations (PROMETHEE), etc. In the description below, it is assumed that the TOPSIS method is utilized. TOPSIS advantageously has stability in providing results, and thus is suitable in a wide range of application areas (e.g., including high-risk fields, such as medical sciences where the TOPSIS method may be used to perform protein ranking for cancer treatments).

Although in the description below it is assumed that TOPSIS is used, other embodiments may utilize other statistical methods including but not limited to AHP, VIKOR, PROMOTHEE, etc.

Performing resource ranking using TOPSIS may include the following steps:
1. Formula for Vector Normalization:

$$\bar{x}_{ij} = \frac{x_{ij}}{\sqrt{\sum_{j=1}^{n} x_{ij}^2}}$$

2. Calculate Euclidean Distance from Ideal Best:
   $S_i^+ = [\sum_{j=1}^{m}(v_{ij}-v_j^+)^2]^{0.5}$, where $v_j^+$ denotes the Ideal (best) value
3. Calculate Euclidean Distance from Ideal Worst:
   $S_i^- = [\sum_{j=1}^{m}(v_{ij}-v_j^-)^2]^{0.5}$, where $v_j^-$ denotes the Ideal (worst) value
4. Calculate Performance Scores $$P_i = \frac{S_i^-}{S_i^+ + S_i^-}$$

Figure 12:
FIG. 12 shows a table illustrating normalized values for speed and cost parameters for resource ranking, according to an illustrative embodiment.

In the equations above, $x_{ij}$ represents the element value of each criteria or feature, and $v_{ij}$ represents the normalized value of each criteria or feature. For example, values of $x_{11}$, $x_{12}$, $x_{13}$, $x_{14}$ may represent features 1, 2, 3 and 4. Normalization is then performed to obtain a normalized decision matrix $\bar{x}_{ij}$. FIG. 12 shows a table 1200 illustrating final normalized values for the speed and cost parameters in the table 1100 using the TOPSIS method.

Figure 13:
FIG. 13 shows a table illustrating weighted normalized values for speed and cost parameters for resource ranking, according to an illustrative embodiment.

The normalized values are multiplied with weights w and the result is the normalized decision matrix. Here, $v_{ij}$ is the value of the weighted normalized result for each element. It should be noted that weights can be taken or computed using various approaches. In some embodiments, an entropy method is used for assigning weights, such that $v_{ij}=x_{ij}*w$. In other embodiments, however, different methods for weight assignment may be utilized (e.g., where the same weighting is given to multiple parameters, a first higher weight for a few parameters and a second lower weight for other parameters, etc.). FIG. 13 shows a table 1300 illustrating the weighted normalized vector values for the speed and cost parameters in the table 1100 using the TOPSIS method and an entropy method for weight assignment.

Figure 14:
FIG. 14 shows a table illustrating final performance scores and rankings of resources, according to an illustrative embodiment.
Figure 15:
FIG. 15 shows a table illustrating task assignment using the intelligent water drop algorithm and multi-parameter resource ranking, according to an illustrative embodiment.

FIG. 14 shows a table 1400 of final performance scores, $P_i$, and rank for the different resources in the table 1100 using the TOPSIS method. The table 1400 is an example of the output of the resource ranking module 1012. The task assignment module 1010 of the intelligent workflow scheduler 1001 uses the IWD algorithm for path construction of a workflow, and then assigns tasks in the ranking order produced by the resource ranking module 1012. The IWD algorithm will proceed in a manner similar to that described above with respect to the single parameter optimization and FIGS. 6-9. FIG. 15 shows a table 1500 illustrating the complete task assignments using the IWD algorithm, based on the multiple parameter optimization ranking of the resources described above. From the table 1500, it is seen that the intelligent workflow scheduler 1001 assigns all tasks in the WD_Path$_{best}$ to the VM which has the top ranking in the table 1400 of FIG. 14 (e.g., VM3).

Illustrative embodiments provide a number of advantages relative to conventional approaches. For example, conventional heuristic and metaheuristic algorithms fail to perform intelligent and efficient workload scheduling in virtualized computing environments. Further, conventional heuristic and metaheuristic algorithms fail to handle multi parameter optimization-based scheduling. Illustrative embodiments overcome these and other disadvantages, through a novel, nature inspired and efficient metaheuristic-based approach (e.g., the IWD algorithm described above) for workload scheduling that may be used in both single and multi-parameter optimization. Further, illustrative embodiments can integrate MCDM algorithms with the IWD algorithm to efficiently handle multi-parameter optimization-based workload scheduling. The IWD algorithm may be used to perform task assignments to available resources for single parameter optimization. For multi-parameter optimization, an MCDM algorithm such as TOPSIS is integrated with the IWD algorithm. Thus, the IWD algorithm when used for single or multi-parameter optimization can calculate the relative closeness of alternatives and perform a final ranking of resources for intelligent workload scheduling. This advantageously improves efficiency of virtualized computing environments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for intelligent workload scheduling using rankings of sequences of workload tasks will now be described in greater detail with reference to FIGS. 16 and 17. Although described in the context of system 100, these platforms may also be used to implement at least portions of other information processing systems in other embodiments.

Figure 16:
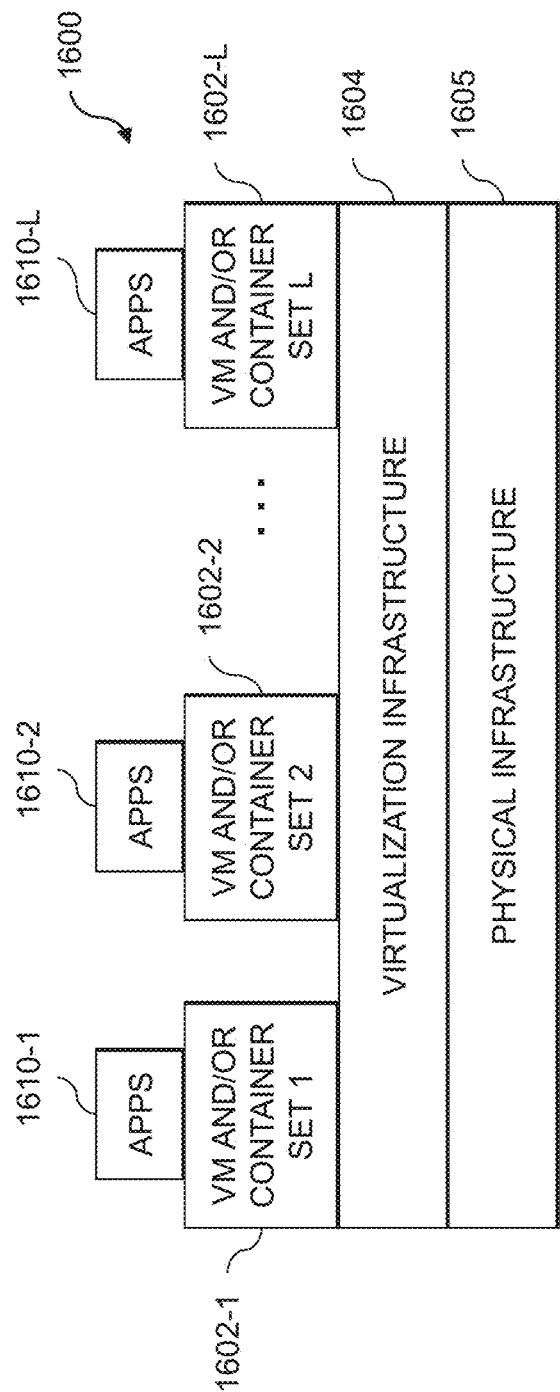
FIGS. 16 and 17 show examples of processing platforms that may be utilized to implement at least a portion of an information processing system in illustrative embodiments.
Figure 17:
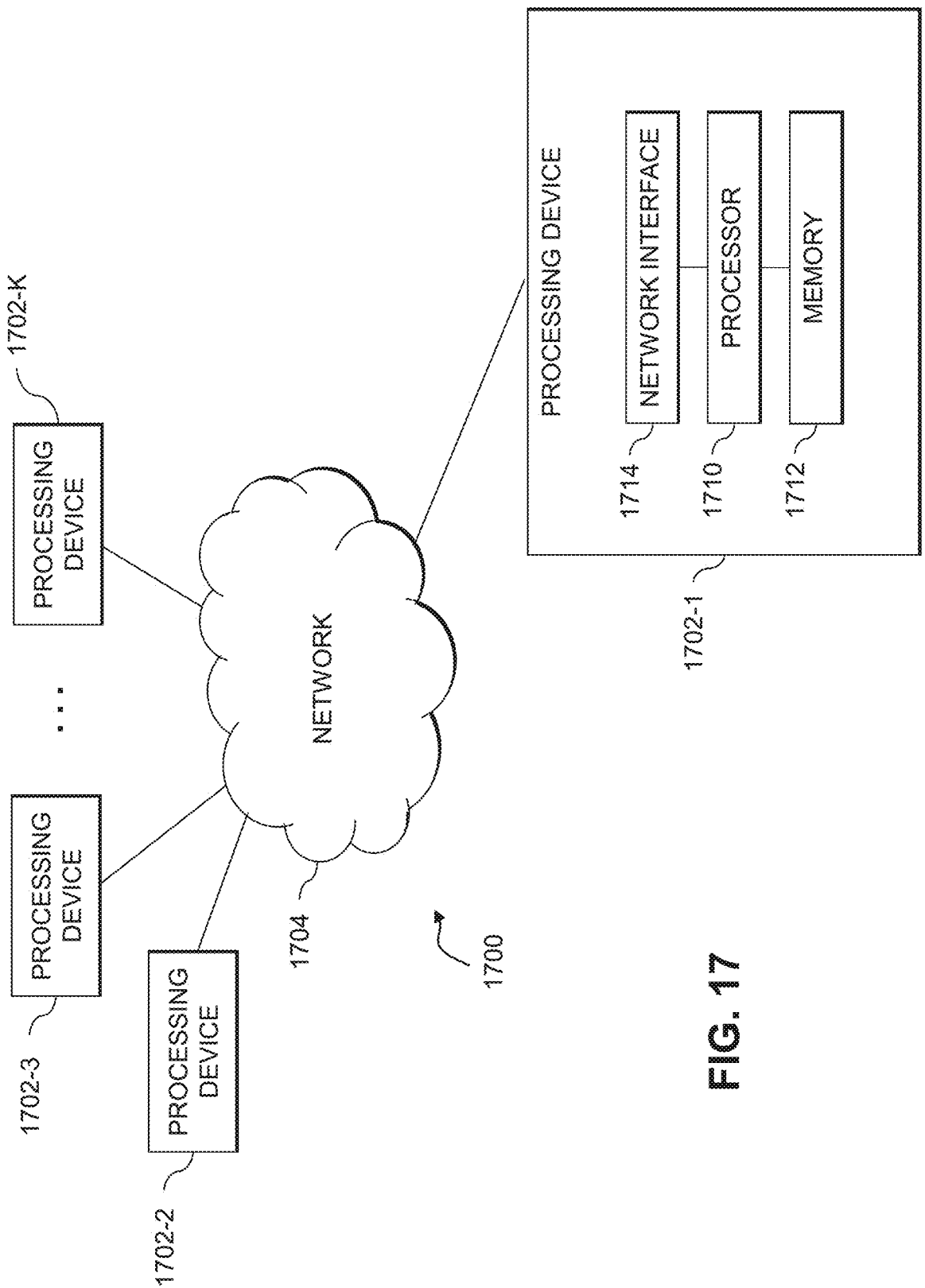

FIG. 16 shows an example processing platform comprising cloud infrastructure 1600. The cloud infrastructure 1600 comprises a combination of physical and virtual processing resources that may be utilized to implement at least a portion of the information processing system 100 in FIG. 1. The cloud infrastructure 1600 comprises multiple virtual machines (VMs) and/or container sets 1602-1, 1602-2, . . . 1602-L implemented using virtualization infrastructure 1604. The virtualization infrastructure 1604 runs on physical infrastructure 1605, and illustratively comprises one or more hypervisors and/or operating system level virtualization infrastructure. The operating system level virtualization infrastructure illustratively comprises kernel control groups of a Linux operating system or other type of operating system.

The cloud infrastructure 1600 further comprises sets of applications 1610-1, 1610-2, . . . 1610-L running on respective ones of the VMs/container sets 1602-1, 1602-2, . . . 1602-L under the control of the virtualization infrastructure 1604. The VMs/container sets 1602 may comprise respective VMs, respective sets of one or more containers, or respective sets of one or more containers running in VMs.

In some implementations of the FIG. 16 embodiment, the VMs/container sets 1602 comprise respective VMs implemented using virtualization infrastructure 1604 that comprises at least one hypervisor. A hypervisor platform may be used to implement a hypervisor within the virtualization infrastructure 1604, where the hypervisor platform has an associated virtual infrastructure management system. The underlying physical machines may comprise one or more distributed processing platforms that include one or more storage systems.

In other implementations of the FIG. 16 embodiment, the VMs/container sets 1602 comprise respective containers implemented using virtualization infrastructure 1604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1600 shown in FIG. 16 may represent at least a portion of one processing platform. Another example of such a processing platform is processing platform 1700 shown in FIG. 17.

The processing platform 1700 in this embodiment comprises a portion of system 100 and includes a plurality of processing devices, denoted 1702-1, 1702-2, 1702-3, . . . 1702-K, which communicate with one another over a network 1704.

The network 1704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1702-1 in the processing platform 1700 comprises a processor 1710 coupled to a memory 1712.

The processor 1710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1712 may comprise random access memory (RAM), read-only memory (ROM), flash memory or other types of memory, in any combination. The memory 1712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1702-1 is network interface circuitry 1714, which is used to interface the processing device with the network 1704 and other system components, and may comprise conventional transceivers.

The other processing devices 1702 of the processing platform 1700 are assumed to be configured in a manner similar to that shown for processing device 1702-1 in the figure.

Again, the particular processing platform 1700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for intelligent workload scheduling using rankings of sequences of workload tasks as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, devices, resources, workflows, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   receiving a request to schedule a workload for execution on one or more of a plurality of assets of an information technology infrastructure;
   generating a graph representation of a plurality of tasks of the workload, the graph representation comprising two or more levels each comprising one or more nodes each representing one of the plurality of tasks of the workload;
   identifying a plurality of paths each representing a sequence of two or more of the plurality of tasks of the workload that starts at a root node in a first one of the two or more levels of the graph representation and traverses one or more additional nodes in one or more additional ones of the two or more levels of the graph representation;
   determining a ranking of the plurality of paths utilizing a first algorithm;
   determining a ranking of the plurality of assets of the information technology infrastructure utilizing a second algorithm, the second algorithm being different than the first algorithm; and
   assigning each of the plurality of tasks of the workload for execution on one of the plurality of assets of the information technology infrastructure based at least in part on the determined ranking of the plurality of paths and the determined ranking of the plurality of assets;
   wherein the determined ranking of the plurality of assets is based at least in part on a first set of one or more parameters characterizing performance of the plurality of assets of the information technology infrastructure and a second set of one or more parameters characterizing cost of utilizing the plurality of assets of the information technology infrastructure; and
   wherein at least one of (i) the first algorithm comprises a meta-heuristic algorithm and (ii) the second algorithm comprises a statistical method configured to solve a multi-attribute decision making problem.

2. The apparatus of claim 1 wherein the plurality of assets of the information technology infrastructure comprise virtualized computing resources, the virtualized computing resources comprising at least one of one or more virtual machines and one or more software containers.

3. The apparatus of claim 1 wherein the first algorithm comprises an intelligent water drops meta-heuristic algorithm.

4. The apparatus of claim 3 wherein determining the ranking of the plurality of paths utilizing the intelligent water drops meta-heuristic algorithm comprises:
   determining a sub-graph value for each node in the graph representation, the sub-graph value for a given node in a given one of the two or more levels of the graph representation representing a number of other nodes in one or more other levels of the graph representation below the given level that the given node is connected to; and
   assigning a decision condition value to each node in the graph representation, wherein nodes in the graph representation having a non-zero sub-graph value are assigned a first decision condition value and wherein nodes in the graph representation having a zero sub-graph value are assigned a second decision condition value different than the first decision condition value.

5. The apparatus of claim 3 wherein determining the ranking of the plurality of paths utilizing the intelligent water drops meta-heuristic algorithm comprises performing two or more iterations of identifying a top remaining one of the plurality of paths from the root node to a sink node in a given one of the two or more levels in the graph representation, the sink node not being connected to one or more additional nodes in another one of the two or more levels in the graph representation lower than the given level in the graph representation.

6. The apparatus of claim 5 wherein, in each subsequent one of the two or more iterations following one or more previous ones of the two or more iterations, the sink node of the top remaining one of the plurality of paths identified in each of the one or more previous ones of the two or more iterations is removed from the graph representation.

7. The apparatus of claim 5 wherein identifying the top remaining one of the plurality of paths in each of the two or more iterations comprises:
   starting at the root node in the first level of the graph representation, identifying a set of one or more possible paths to a next node in a next one of the two or more levels of the graph representation;
   calculating a probability of visiting each of the set of one or more possible paths;
   selecting one of the next nodes in the next level of the graph representation based at least in part on the calculated probabilities of visiting each of the set of one or more possible paths; and
   repeating, starting from the selected next node until a sink node is reached, identifying the set of one or more possible paths, calculating the probabilities, and selecting one of the next nodes until a sink node is reached.

8. The apparatus of claim 7 wherein calculating the probability of visiting a given one of the set of one or more possible paths to a given one of the next nodes is based on a ratio of a state measurement for the given next node to a sum of the state measurements for the set of one or more possible paths, wherein the state measurement for the given next node is based at least in part on (i) a sub-graph value for the given next node representing a number of other nodes in one or more other levels of the graph representation below the next level that the given next node is connected to and (ii) a decision condition value assigned to the given next node.

9. The apparatus of claim 8 wherein repeating the identifying the set of one or more possible paths starting from the selected next node utilizes an updated state measurement for the selected next node, the updated state measurement being based at least in part on a time taken for execution of a given one of the plurality of tasks corresponding to the selected next node.

10. The apparatus of claim 1 wherein the first set of one or more parameters characterizing performance of the plurality of assets of the information technology infrastructure comprises a speed parameter, the speed parameter of a given asset comprising a number of instructions capable of being executed within a designated time frame.

11. The apparatus of claim 1 wherein the first set of one or more parameters characterizing performance of the plurality of assets of the information technology infrastructure comprises two or more of a speed parameter, a power consumption parameter and a load parameter.

12. The apparatus of claim 11 wherein the second algorithm comprises a Technique for Order of Preference by Similarity to Ideal Solution (TOPSIS) algorithm.

13. The apparatus of claim 1 wherein assigning each of the plurality of tasks of the workload for execution on one of the plurality of assets of the information technology infrastructure comprises assigning the plurality of tasks of the workload level by level in the two or more levels of the graph representation, and wherein for each level tasks are assigned in an order determined by the ranking of the plurality of paths to an available one of the plurality of assets in an order determined by the ranking of the plurality of assets.

14. The apparatus of claim 1 wherein the second algorithm comprises at least one of an Analytical Hierarchy Process (AHP) algorithm, a Technique for Order of Preference by Similarity to Ideal Solution (TOPSIS) algorithm, a VlseKriterijumska Optimizacija I Kompromisno Resenje (VIKOR) algorithm, and a Preference Ranking Organization Method for Enrichment Evaluations (PROMETHEE) algorithm.

15. A computer program product comprising a non-transitory processor-readable storage medium having stored therein program code of one or more software programs, wherein the program code when executed by at least one processing device causes the at least one processing device to perform steps of:
receiving a request to schedule a workload for execution on one or more of a plurality of assets of an information technology infrastructure;
generating a graph representation of a plurality of tasks of the workload, the graph representation comprising two or more levels each comprising one or more nodes each representing one of the plurality of tasks of the workload;
identifying a plurality of paths each representing a sequence of two or more of the plurality of tasks of the workload that starts at a root node in a first one of the two or more levels of the graph representation and traverses one or more additional nodes in one or more additional ones of the two or more levels of the graph representation;
determining a ranking of the plurality of paths utilizing a first algorithm;
determining a ranking of the plurality of assets of the information technology infrastructure utilizing a second algorithm, the second algorithm being different than the first algorithm; and
assigning each of the plurality of tasks of the workload for execution on one of the plurality of assets of the information technology infrastructure based at least in part on the determined ranking of the plurality of paths and the determined ranking of the plurality of assets;
wherein the determined ranking of the plurality of assets is based at least in part on a first set of one or more parameters characterizing performance of the plurality of assets of the information technology infrastructure and a second set of one or more parameters characterizing cost of utilizing the plurality of assets of the information technology infrastructure; and
wherein at least one of (i) the first algorithm comprises a meta-heuristic algorithm and (ii) the second algorithm comprises a statistical method configured to solve a multi-attribute decision making problem.

16. The computer program product of claim 15 wherein assigning each of the plurality of tasks of the workload for execution on one of the plurality of assets of the information technology infrastructure comprises assigning the plurality of tasks of the workload level by level in the two or more levels of the graph representation, and wherein for each level tasks are assigned in an order determined by the ranking of the plurality of paths to an available one of the plurality of assets in an order determined by the ranking of the plurality of assets.

17. The computer program product of claim 15 wherein the second algorithm comprises a Technique for Order of Preference by Similarity to Ideal Solution (TOPSIS) algorithm.

18. A method comprising:
receiving a request to schedule a workload for execution on one or more of a plurality of assets of an information technology infrastructure;
generating a graph representation of a plurality of tasks of the workload, the graph representation comprising two or more levels each comprising one or more nodes each representing one of the plurality of tasks of the workload;
identifying a plurality of paths each representing a sequence of two or more of the plurality of tasks of the workload that starts at a root node in a first one of the two or more levels of the graph representation and traverses one or more additional nodes in one or more additional ones of the two or more levels of the graph representation;
determining a ranking of the plurality of paths utilizing a first algorithm;
determining a ranking of the plurality of assets of the information technology infrastructure utilizing a second algorithm, the second algorithm being different than the first algorithm; and
assigning each of the plurality of tasks of the workload for execution on one of the plurality of assets of the information technology infrastructure based at least in part on the determined ranking of the plurality of paths and the determined ranking of the plurality of assets;
wherein the determined ranking of the plurality of assets is based at least in part on a first set of one or more parameters characterizing performance of the plurality of assets of the information technology infrastructure and a second set of one or more parameters characterizing cost of utilizing the plurality of assets of the information technology infrastructure;

wherein at least one of (i) the first algorithm comprises a meta-heuristic algorithm and (ii) the second algorithm comprises a statistical method configured to solve a multi-attribute decision making problem; and wherein the method is performed by at least one processing device comprising a processor coupled to a memory.

19. The method of claim 18 wherein assigning each of the plurality of tasks of the workload for execution on one of the plurality of assets of the information technology infrastructure comprises assigning the plurality of tasks of the workload level by level in the two or more levels of the graph representation, and wherein for each level tasks are assigned in an order determined by the ranking of the plurality of paths to an available one of the plurality of assets in an order determined by the ranking of the plurality of assets.

20. The method of claim 18 wherein the second algorithm comprises a Technique for Order of Preference by Similarity to Ideal Solution (TOPSIS) algorithm.

* * * * *